United States Patent
Kitani (10) Patent No.: US 6,229,245 B1
(45) Date of Patent: *May 8, 2001

(54) CONTROL APPARATUS FOR VIBRATION WAVE MOTOR

(75) Inventor: Koji Kitani, Chofu (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/189,788

(22) Filed: Nov. 12, 1998

(30) Foreign Application Priority Data

Nov. 14, 1997 (JP) .................................................. 9-313625
Oct. 29, 1998 (JP) ................................................. 10-308684

(51) Int. Cl.⁷ .............................. H01L 41/04; H02N 7/06
(52) U.S. Cl. ............................. 310/316.02; 310/323.03; 318/116
(58) Field of Search ...................... 310/316.01, 316.02, 310/317, 318, 319, 321, 323.03; 329/328; 331/73, 116 R; 318/116

(56) References Cited

U.S. PATENT DOCUMENTS

| | | | |
|---|---|---|---|
| 4,914,337 | * 4/1990 | Takagi .................................. | 310/316 |
| 4,954,741 | * 9/1990 | Furutsu et al. ....................... | 310/316 |
| 5,034,646 | 7/1991 | Shirasaki .............................. | 310/323 |
| 5,157,300 | 10/1992 | Kataoka ............................... | 310/323 |
| 5,162,708 | * 11/1992 | Naito et al. .......................... | 318/116 |
| 5,164,629 | * 11/1992 | Nakanishi ............................ | 310/323 |
| 5,165,047 | * 11/1992 | Shimizu ............................... | 318/116 |
| 5,214,339 | * 5/1993 | Naito ................................... | 310/316 |
| 5,495,152 | * 2/1996 | Fukui ................................... | 318/116 |
| 5,612,598 | * 3/1997 | Fukui et al. ......................... | 318/116 |
| 5,731,652 | * 3/1998 | Shimada .............................. | 310/316 |

FOREIGN PATENT DOCUMENTS

| | | |
|---|---|---|
| 2-111274 | 4/1990 | (JP) . |
| 2-151284 | 6/1990 | (JP) . |
| 5-137358 | 6/1993 | (JP) . |
| 6-261556 | 9/1994 | (JP) . |

OTHER PUBLICATIONS

European Search Report (Ref. No. 2616630) dated Dec. 21, 1999.

* cited by examiner

*Primary Examiner*—Nestor Ramirez
*Assistant Examiner*—Dang Dinh Le
(74) *Attorney, Agent, or Firm*—Fitzpatrick, Cella, Harper & Scinto (57) ABSTRACT

A control apparatus for driving a vibration wave motor, in which localized fixation between a vibration member and a contact member in contact with the vibration member is peeled off by shifting the frequency of an applied frequency signal from a frequency higher than the resonant frequency to a lower frequency.

8 Claims, 11 Drawing Sheets

CONTROL APPARATUS FOR VIBRATION WAVE MOTOR

BACKGROUND OF THE INVENTION

1. Field of the Invention

The present invention relates to a control apparatus for a vibration wave motor which causes relative movement between a vibration member and a member in press contact with the vibration member by generating a travelling vibration wave in the vibration member.

2. Related Background Art

A vibration wave apparatus (vibration wave motor) using a travelling vibration wave utilizes the following principle. A vibration member (stator) is constituted by fixing two groups of electro-mechanical energy conversion elements, i.e., piezoelectric elements (either a single-plate element or a plurality of elements can be divided into groups) arranged in the circumferential direction on one surface of a ring-like, elliptical, or oblong elastic member having a total length equal to an integer multiple of a given length $\lambda$. These piezoelectric elements are arranged at a pitch of $\lambda/2$ within each group to alternately have opposite expansion-shrinkage polarities. The two groups have a shift relative to each other equal to an odd multiple of $\lambda/4$.

Electrodes films are respectively formed on the two groups of piezoelectric elements. When an AC voltage is applied to only one of either group (to be referred to as phase A hereinafter), the whole elastic member generates a standing wave (wavelength $\lambda$) of flexural vibration having antinodes at the central point of each piezoelectric element of the group and points from the central point at a pitch of $\lambda/2$ or having nodes at the central points between these antinodes.

When an AC voltage is applied to only the other group (to be referred to as phase B hereinafter), a standing wave is similarly generated, but its antinodes and nodes are shifted from those of the standing wave generated by phase A by $\lambda/4$. If AC voltages having the same frequency and a time phase difference of 90° are simultaneously applied to both phases A and B, the elastic member generates a travelling wave (wavelength $\lambda$) of flexural vibration that vibrates in the circumferential direction as a result of the synthesis of standing waves by the two phases. At this time, each point of the elastic member having a thickness elliptically moves.

When, e.g., a ring-like moving member, such as a rotor, is in press contact with one surface of the elastic member, the moving member rotates upon reception of a circumferential frictional force from the elastic member. If a plurality of radial grooves are formed in the circumferential direction in the surface of the vibration member opposite the piezoelectric element fixing surface in order to increase the circumferential components of elliptical movement, the neutral plane of vibration moves to the piezoelectric element fixing surface to increase both the rotational number and the motor efficiency with the same amplitude. These grooves also function to remove any wear powder. From this principle, the vibration wave apparatus has the following advantages:

1) The vibration wave apparatus has a holding torque during no current supply, and does not cause hunting during positioning.
2) The vibration wave apparatus rotates quickly and stops rotating quickly (small mechanical time constant) due to a small inertia and a large driving torque.
3) The vibration wave apparatus is free from any cogging because all the points on the circumference generate the same driving force.

The vibration wave apparatus therefore is theoretically suitable for high-precision rotation and high-precision positioning. However, since the vibration wave apparatus uses a frictional force, variations in motor performance are inevitable owing to wear of the frictional surface over time or changes in the frictional force with changes in humidity or temperature.

Based on these advantages and disadvantages, a sliding material must satisfy the following requirements:

1) The sliding material must have a sufficiently large frictional coefficient (in order to increase the motor torque).
2) The sliding material must have a sufficiently high wear resistance (in order to maintain the motor performance over time).
3) The sliding material must have a sufficiently high thermal conductivity (in order to improve heat dissipation and prevent temperature changes in motor characteristics).
4) The moving member must be lightweight (in order to decrease the inertia).

To satisfy conditions 1) and 3), the sliding material is desirably a combination of inorganic materials. However, inorganic materials have poor wear resistance when used as a material for a vibration wave apparatus, and applications of the vibration wave apparatus are limited.

In general, a combination of sliding materials for the vibration wave apparatus is proposed as a combination of a composite resin, which exhibits relatively low wear, and an inorganic material. Examples of the composite resin are resins prepared by providing, in a heat-resistant resin used as a base material, a fiber such as carbon fiber, glass fiber, and aromatic polyamide fiber, a whisker such as silicon nitride, silicon carbide, or potassium titanate, a filler having a reinforcing action or an action of increasing the thermal conductivity, and a filler having a lubricating action such as PTFE resin, molybdenum disulfide, or graphite.

Examples of the inorganic material are a raw or surface-hardened metal of stainless steel or phosphor bronze, a tungsten, nickel, cobalt, or chrome plating layer, a material prepared by filling or precipitating silicon carbide for reinforcement or a fluoroplastic for stabilizing the coefficient of friction in the plating layer, various oxide and carbide ceramics and metals, and a composite sprayed material. Some of these materials are practically available.

Some combinations of composite resins and inorganic materials exhibit high wear resistance. However, when such composite resin and inorganic material are used for steady sliding surfaces to a certain degree upon driving by a driving apparatus, they are fixed to each other (to be referred to as a fixation phenomenon hereinafter) in a humid environment.

This fixation phenomenon is analyzed in various references. For example, the fixation phenomenon is chemically explained by a theory of resin hydrolysis in Japanese Patent Application Laid-Open No. 6-261556 and a theory of metal ion presence in Japanese Patent Application Laid-Open No. 5-137358.

However, in experiments, a composite resin and inorganic material excellent in motor performance and wear resistance (e.g., wear of about several $\mu$m upon driving of 100 hrs) are always fixed to each other.

This fixation phenomenon is experimentally confirmed to occur even with a slight difference in fixing force regardless of wettability of the surface of the base material of the composite resin, a thermosetting resin, a thermoplastic resin, crystallinity, a material (polytetrafluoroethylene, polyether ether ketone, polyether sulfone, polyamide, or polyimide), a filler (carbon fiber, carbon bead, potassium titanate whisker, or molybdenum disulfide), and the inorganic material (type of metal or ceramic (carbide or oxide)) of the combination. Note that even analysis upon experiments could not determine hydrolysis of the resin.

As a result of various examinations of conditions under which the fixation phenomenon occurred, conditions on the vibration wave apparatus side are 1) the fixation phenomenon occurs with a combination of materials producing a wear powder about 1 pm or less in minimum size upon driving, and
2) the fixation phenomenon occurs upon driving for a given time.

Environmental conditions are 1) the fixation phenomenon depends on the relative humidity rather than the absolute humidity (temperature dependency is small at 0° C. or higher), and
2) the fixation phenomenon occurs upon abrupt changes in temperature.

In the vibration wave apparatus, therefore, the fixation phenomenon is supposed to be caused by sliding surfaces very close to each other without the mediacy of any large wear powder, and by microscopic condensation as an external factor.

This phenomenon is inferred as follows. When the frictional portion is driven to a given degree, the sliding surfaces of the vibration member and moving member "drape". This drape is exemplified as changes in contact surface:

(1) Contamination of the surface in processing and pre-driving environments is removed by sliding.

(2) The contact stress is unified (surface roughness is unified and a nonuniform contact state is improved).

(3) A chemical equilibrium is attained (chemical changes by the temperature of the sliding surface, work-hardening by the stress, and chemical or physical adsorption of the surface determined by the above surface states and the atmosphere reach a steady state).

(2) Unifying the contact stress simultaneously unifies the surface roughness to a certain degree. Roughly speaking, the surface roughness in a steady sliding direction represents that wear upon sliding occurs in the state of wear powder particles having a size corresponding to surface roughness level. The steady surface roughness and wear amount correlate with each other depending on the strength of the material.

That is, the surface roughness of a durable sliding member is small, and the contact area increases in correspondence with a decrease in distance between two sliding surfaces. The contact area of a material such as a resin which readily creeps increases.

For this reason, when the vibration wave apparatus is placed in a humid environment or experiences an abrupt temperature drop even in the presence of a slight absolute humidity, condensation occurs on portions of the sliding surfaces close to each other, and an intermolecular force acts to microscopically fix the sliding surfaces to each other. The fixed sliding surfaces cannot be separated even by drying due to the following reason. Water molecules entering the gap between the two adjacent surfaces are held by adjacent space enclosing surfaces and in some cases by a Van der Waals force between wear powder particles smaller in size than the distance between the adjacent surfaces. Even if the vapor pressure in a slightly open space decreases, the water molecules are not separated. When resin is employed, the slightly open space is further narrowed by creeping of the material, and the fixation becomes stronger. The fixation makes it difficult to activate the vibration wave apparatus and he like.

SUMMARY OF THE INVENTION

It is an object of the present invention to provide a driving apparatus for a vibration wave apparatus that can reliably peel off fixation without influencing the apparatus.

To achieve the above object, one aspect of the present invention is to provide a control apparatus for a vibration wave motor capable of applying a frequency signal to electro-mechanical energy conversion elements arranged on a vibration member to excite the vibration member, and relatively driving a contact member in contact with the vibration member, comprising sweep means for sweeping a frequency of the frequency signal from a frequency higher than a resonant frequency of the motor to a lower frequency while the vibration member is fixed to the contact member.

To peel off fixation, one aspect of the present invention is to provide a control apparatus for a vibration wave motor capable of applying a frequency signal to electro-mechanical energy conversion elements arranged on a vibration member to excite the vibration member, and relatively driving a contact member in contact with the vibration member, comprising a first frequency range mode in which a frequency of the frequency signal is swept from a frequency higher than a resonant frequency of the motor to a predetermined frequency lower than the higher frequency while the vibration member is fixed to the contact member, and a second frequency range mode in which a predetermined frequency lower than a highest frequency in the first frequency range is defined as a maximum frequency, and the frequency of the frequency signal is controlled between the maximum frequency and a predetermined lower frequency.

To achieve the above object, one aspect of the present invention is to provide a control apparatus for a vibration wave motor capable of applying a frequency signal to electro-mechanical energy conversion elements arranged on a vibration member to excite the vibration member, and relatively driving a contact member in contact with the vibration member, comprising a fixation peeling mode in which a level of the frequency signal is sequentially changed by a frequency signal having a frequency lower than a frequency range of the frequency signal used in a normal driving mode of the motor.

The above and other objects, features, and advantages of the present invention will be apparent from the following description of the preferred embodiments in conjunction with the accompanying drawings.

DESCRIPTION OF THE PREFERRED EMBODIMENTS

The present invention will be described in detail below. As a vibration wave apparatus, a travelling vibration wave motor will be exemplified.

Figure 1:
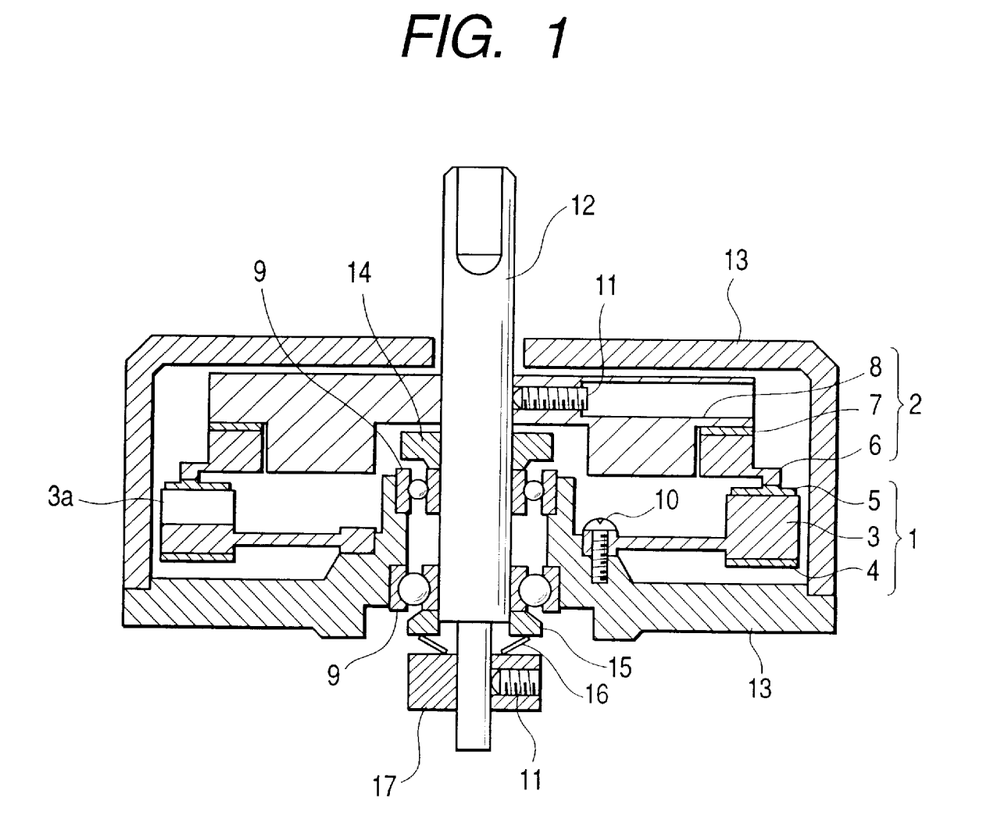
FIG. 1 is a sectional view showing a vibration wave apparatus according to the first embodiment of the present invention.

Referring to FIG. 1, a vibration member 1 is constituted as follows. A piezoelectric element group 4 obtained by forming into a ring shape two groups of piezoelectric elements as electro-mechanical energy conversion elements polarized in units of a plurality of elements is concentrically adhered with a thermoresistance epoxy resin adhesive to one end face of a flexible metal elastic ring 3 made of stainless steel, steel, brass, phosphor bronze, or an aluminum alloy. A PTFE composite resin 5 in which the adhesion force of the adhesive is increased by natrium etching or the like is similarly applied to the other end face. A plurality of grooves are regularly formed into a comb-tooth shape in the circumferential direction in the resin surface in order to increase the motor efficiency.

A ring-like moving member 2 is made up of a wear-resistant material.

The sliding surfaces of the vibration member 1 and moving member 2 are in press contact with each other by a press leaf spring or the like using a load of, e.g., 10 kgf in the axial direction. A step is formed at the sliding portion of the vibration member in the radial direction so as to prevent the sliding edge of the moving member 2 from interfering with rotation. The step is desirably 1 mm or less depending on the wear margin of the vibration wave apparatus in order to efficiently transmit vibration because a soft resin such as a PTFE composite resin has a low modulus of elasticity.

When an AC voltage having the natural frequency of the vibration member 1 is applied to the two groups of piezoelectric elements alternately polarized in the direction of thickness, the vibration member 1 resonates to generate a travelling vibration wave in the circumferential direction. The moving member 2 in press contact with the vibration member 1 is rotated by the frictional force between the sliding surfaces of the vibration member 1 and moving member 2.

A mechanism for peeling off fixation will be described. FIGS. 2A to 2E are graphs showing states wherein the frequency is swept from 75 to 62 kHz for 2 sec, and the applied voltage is gradually increased in fixation in a vibration wave apparatus having an outer diameter of 33 mm, an off-plane 7th-order driving mode, and a resonant frequency (normal driving) of about 63 kHz. The abscissa represents the frequency of the applied voltage, one of two ordinates represents the rotational number of the motor, and the other represents the voltage of a sensor for outputting a voltage proportional to the amplitude of the vibration member.

The sensor voltage is maximized in resonance. For example, in FIG. 2A, a resonant frequency Frs in fixation increases to about 72 kHz. As the applied voltage rises, the sensor voltage fluctuates, and the sliding portion changes. More specifically, upon application of voltages of 140, 160, and 180 Vp-p (FIGS. 2C, 2D, and 2E), the amplitude irregularly fluctuates.

Figure 3:
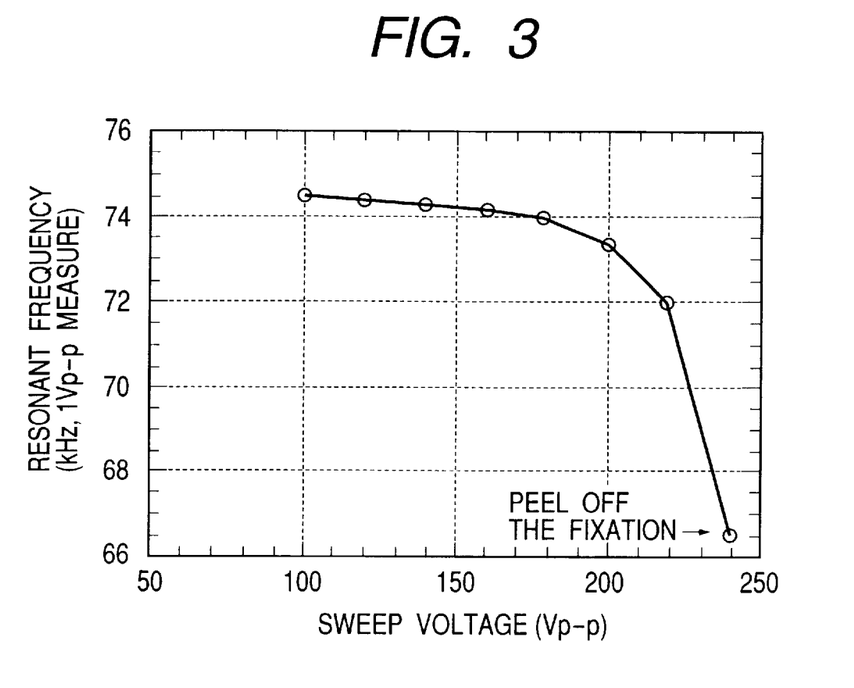
FIG. 3 is a graph showing changes in resonant frequency upon voltage sweeping.

After sweeping at each voltage, the resonant frequency is measured with the same input of 1 Vp-p using an impedance analyzer to find that the resonant frequency gradually decreases, and the vibration wave apparatus comes close to a normal state (FIG. 3) (note that the resonant frequency increases for a smaller amplitude). This means that peeling gradually partially progresses. When the frequency is swept at a higher voltage of 240 Vp-p, the fixation peels off, and the moving member starts rotating.

Figures 2A, 2B:
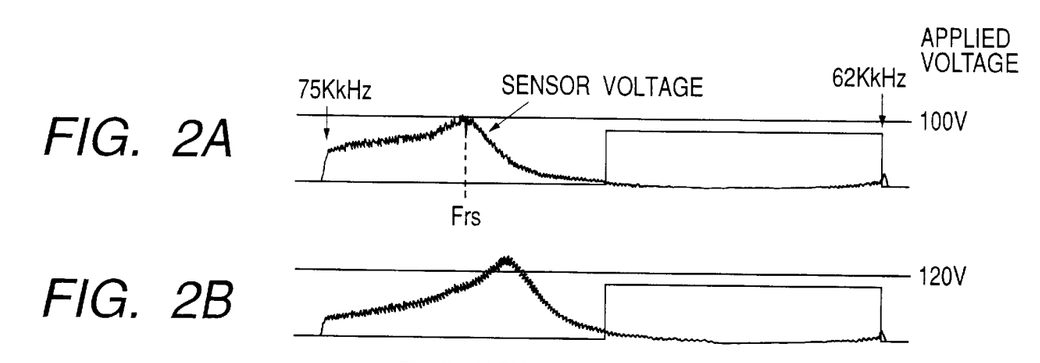
FIGS. 2A, 2B, 2C, 2D, 2E, 2F, 2G and 2H are graphs showing vibration characteristics upon sweeping.
Figure 2C:
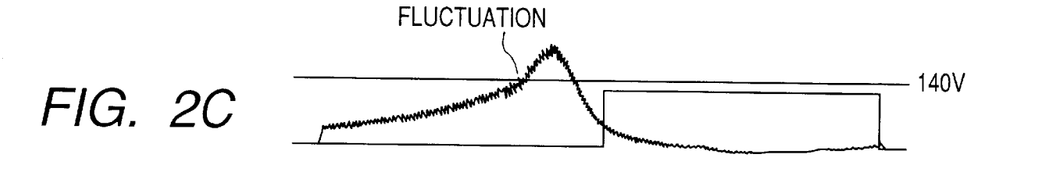
Figure 2D:
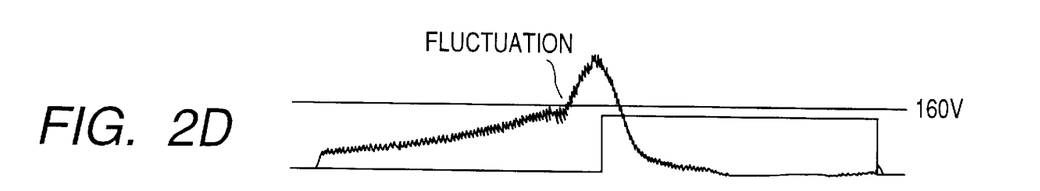
Figure 2E:
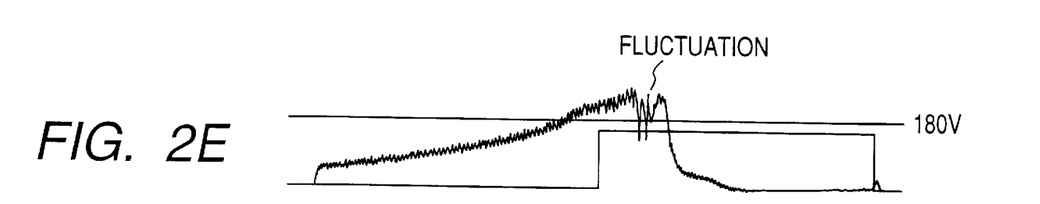
Figure 2F:
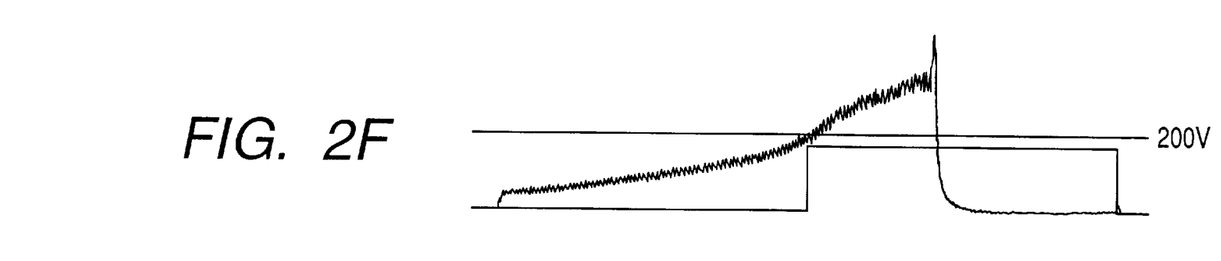
Figure 2G:
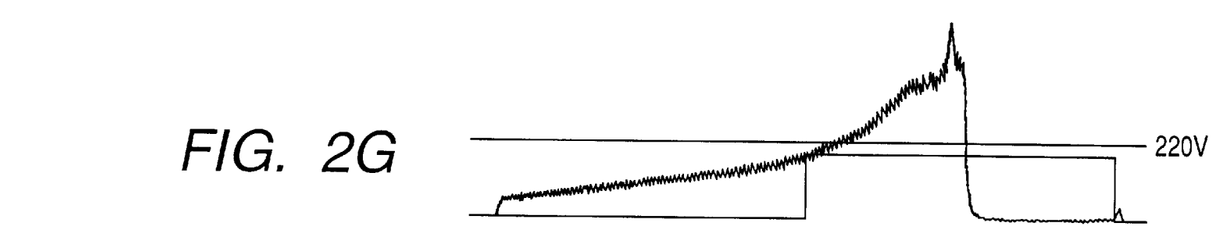
Figure 2H:
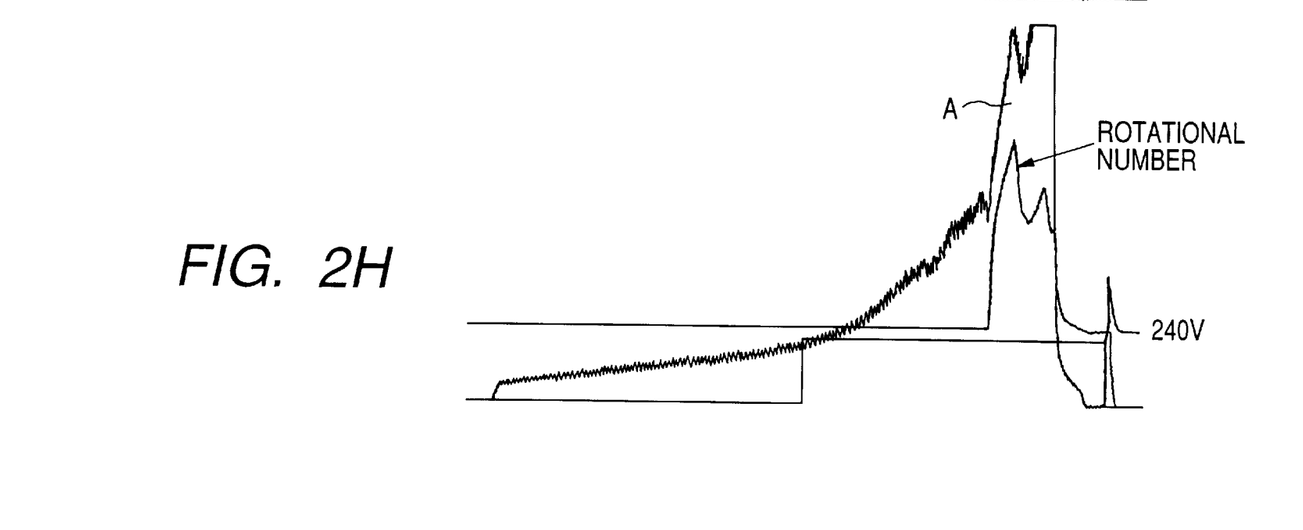

Note that these data only represent the fixation phenomenon. In practice, the fixation peels off by sweeping the sample once. Thus, an amplitude and force sufficient to peel off the fixed portion are generated at a voltage of 240 to 250 Vp-p (FIG. 2H).

Figure 4:
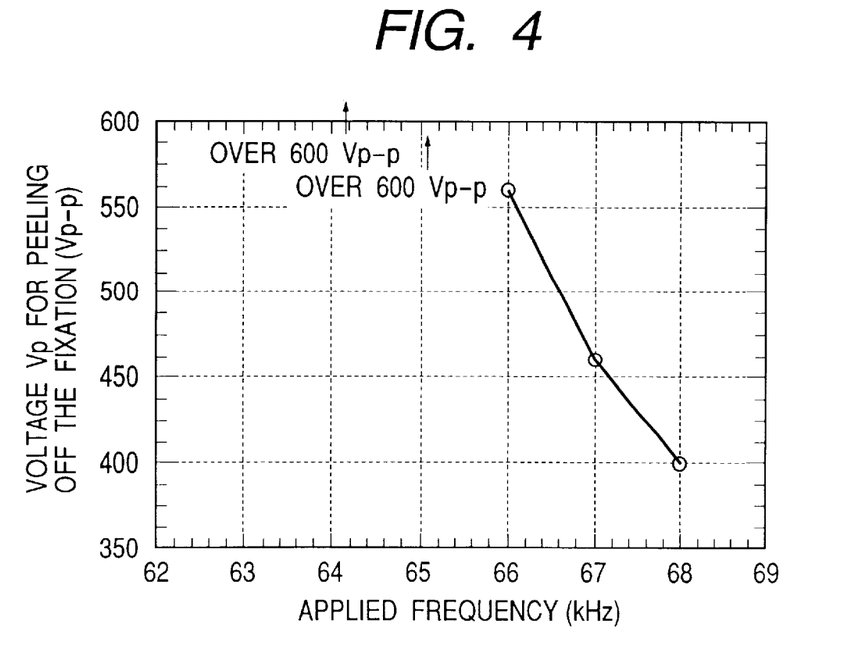
FIG. 4 is a graph showing the voltage for peeling off the fixation at each frequency.

However, at a frequency (fixed to, e.g., 65 kHz) in the normal driving mode, the fixation cannot peel off even upon application of a voltage of 600 Vp-p. FIG. 4 shows an example of a voltage (to be referred to as a voltage Vp) for peeling off the fixation when a frequency in the normal driving mode is fixed.

The voltage rises along with a decrease in applied frequency because the resonant frequency Frs in fixation exceeds the frequency range (e.g., 64 to 68 kHz) in the normal driving mode, a lower applied frequency has a larger difference from the resonant frequency Frs in fixation and hardly has a larger amplitude, and the fixation is difficult to peel off. Therefore, the fixation can peel off at a lower voltage by setting a sweep start frequency Fss higher than the resonant frequency Frs in fixation.

Figure 5:
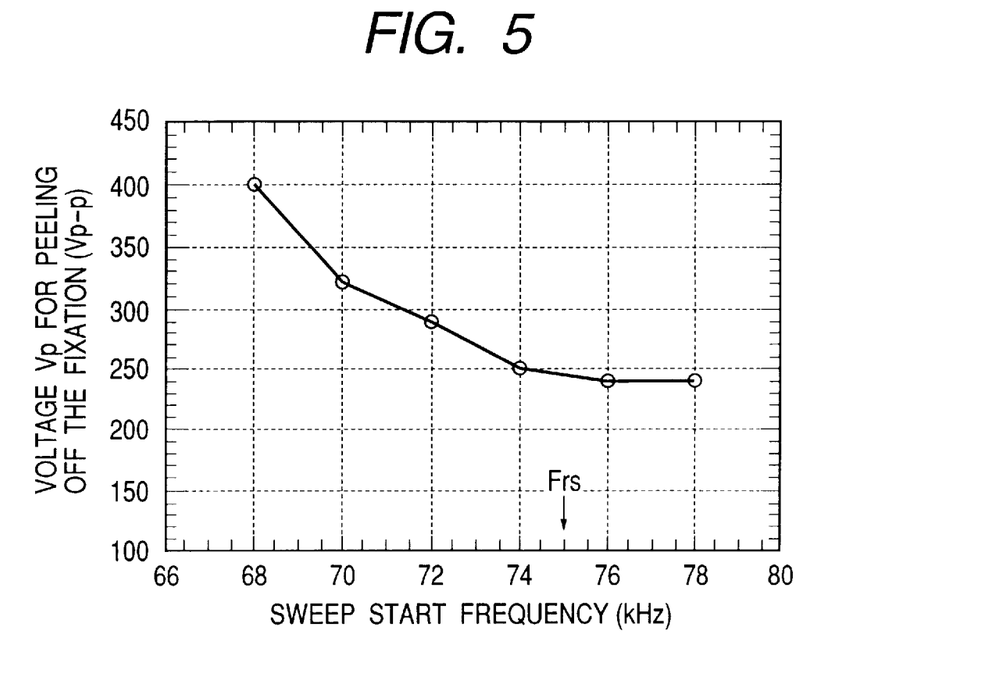
FIG. 5 is a graph showing the sweep start frequency and the voltage for peeling off the fixation.

FIG. 5 shows the voltage Vp for peeling off the fixation when the sweep start frequency Fss is changed. When the sweep start frequency Fss is higher than the resonant frequency Frs in the fixation mode, the voltage is constant. When the sweep start frequency Fss is lower, the voltage abruptly rises.

Figure 6:
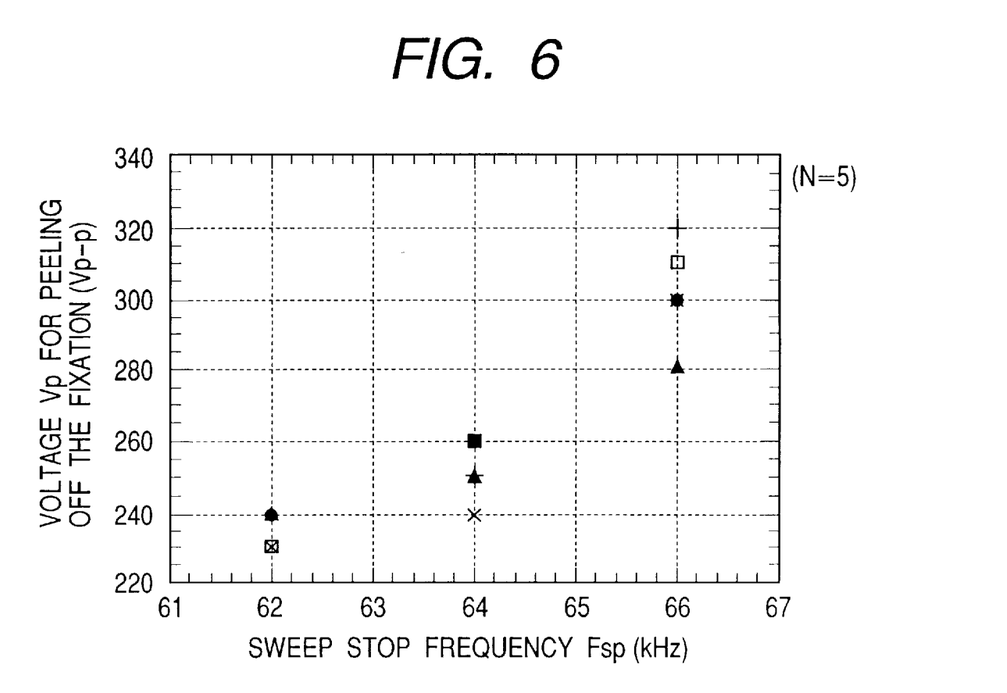
FIG. 6 is a graph showing the relationship between the sweep stop frequency and the voltage for peeling off the fixation.

The sweep stop frequency (Fsp) will be explained. FIG. 6 shows the voltage Vp for peeling off the fixation when the sweep stop frequency Fsp is changed.

From the above reasoning, the voltage Vp for peeling off the fixation is considered to be kept unchanged when the sweep stop frequency Fsp is lower than the resonant frequency Frs in the fixation mode and falls within the frequency range in the normal driving mode. However, actual measurement reveals that the voltage Vp is low when the sweep stop frequency Fsp is set lower than the resonant frequency in the normal driving mode. This cannot be clearly explained but it is presumed that when the resonant frequency Frs in the fixation mode decreases as the fixed portion peels off, the resonant frequency Frs in fixation mode is almost equal to a resonant frequency Frd in driving mode when the final fixed portion peels off.

A maximum amplitude is attained for a given applied voltage at the resonant frequency Frs in fixation mode. Accordingly, the voltage Vp becomes low when the sweep stop frequency Fsp is lower than the resonant frequency Frs in fixation mode, i.e., the resonant frequency Frd in driving mode which becomes almost equal to the resonant frequency Frs in fixation mode immediately before peeling.

In the first embodiment of the present invention, therefore, as a means for peeling off the fixation, the frequency is swept from a frequency higher than the resonant frequency in fixation mode to a frequency lower than the resonant frequency in normal driving mode.

Figure 7:
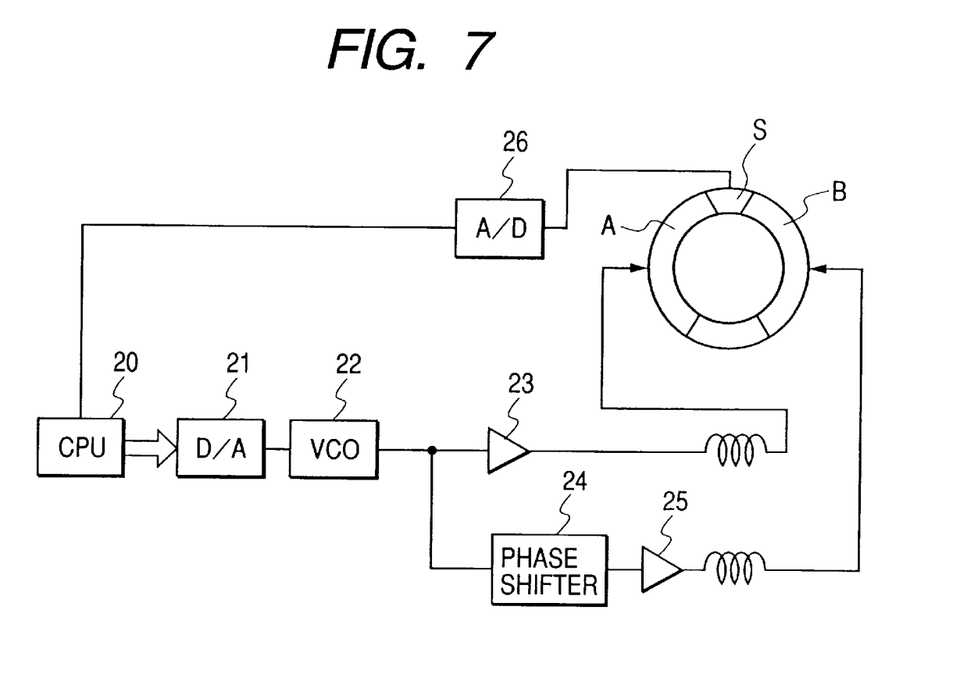
FIG. 7 is a block diagram showing the circuit arrangement of a control apparatus for the vibration wave motor according to the present invention.

FIG. 7 is a block diagram showing a driving apparatus according to the first embodiment of the present invention. Referring to FIG. 7, a microcomputer (CPU) 20 serving as a control circuit controls the operation of the whole apparatus. A D/A converter 21 converts frequency decision data from the CPU 20 into a voltage. The voltage from the converter 21 is input to a voltage-controlled oscillator (VCO) 22. The VCO 22 generates a frequency signal having a frequency corresponding to the voltage supplied from the converter 21. The frequency signal from the VCO 22 is applied to one group (phase A) of piezoelectric elements of the vibration wave motor via an amplifier 23. A phase shifter 24 shifts the phase of the signal 10 from the VCO 22 by 90° and supplies the obtained signal to an amplifier 25. The signal from the phase shifter 24 is supplied to the other group (phase B) of piezoelectric elements. An A/D converter 26 converts an output from a vibration detecting piezoelectric element S arranged on the vibration wave motor into a digital signal and inputs the digital signal to the CPU 20. The piezoelectric element outputs a voltage corresponding to the vibration amplitude of the motor.

Figure 8:
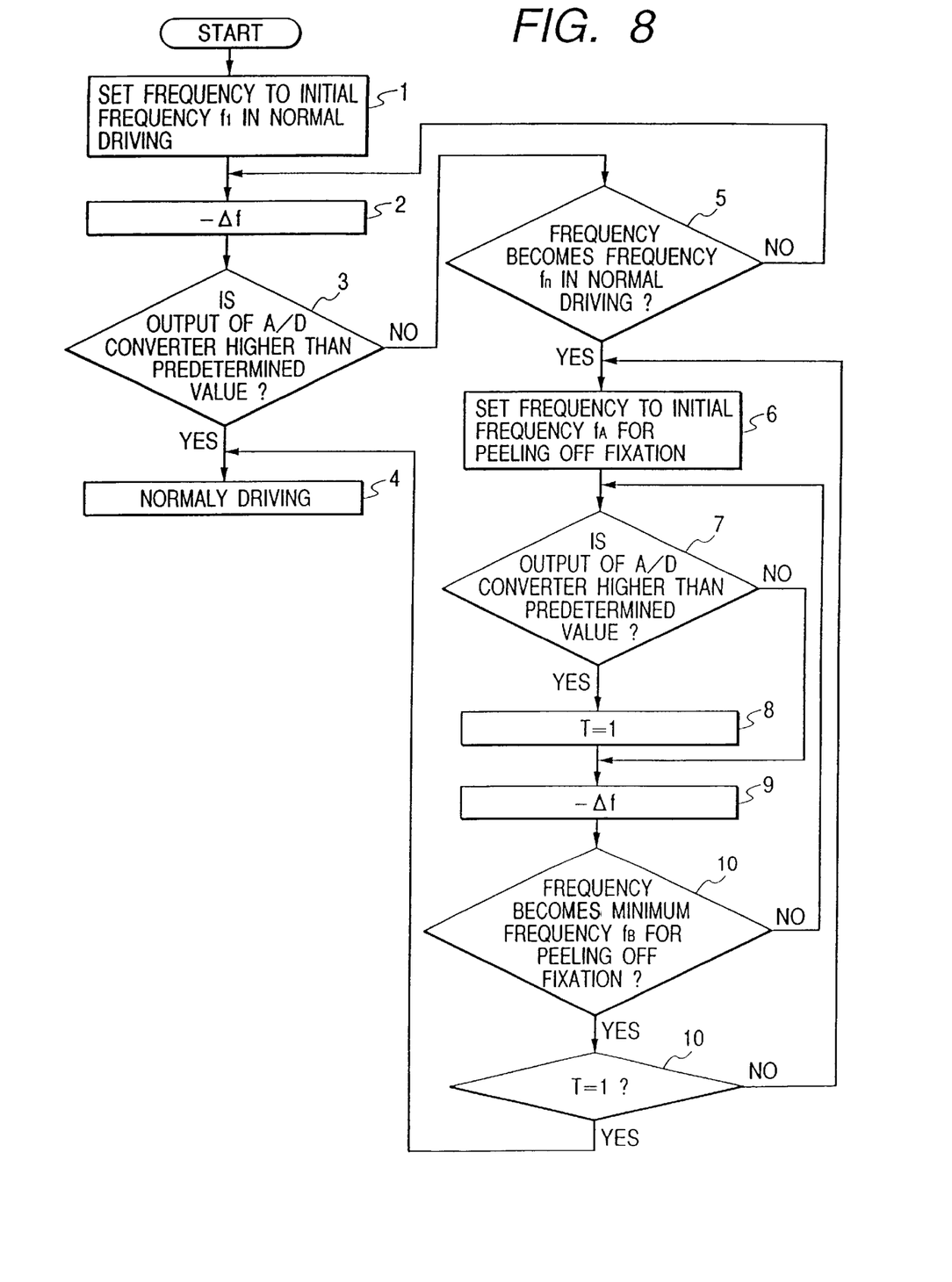
FIG. 8 is a flow chart showing a control flow used by the computer in FIG. 7.

FIG. 8 is a flow chart showing a control flow used by the CPU 20. Operation will be explained with reference to FIGS. 7 and 8.

When the apparatus is activated by turning on the power supply (not shown), an initial frequency fl used in normal driving mode is set in step 1.

The frequency fl is lower than an initial frequency fA for peeling off the fixation and higher than the resonant frequency in the normal driving mode.

In step 2, the frequency is decreased by Δf. Data corresponding to the frequency set in steps 1 and 2 is converted into a voltage by the converter 21. The VCO 22 generates a frequency signal having this frequency and supplies it to the piezoelectric element. In step 3, the CPU 20 receives data obtained by converting an output from the vibration detecting piezoelectric element S into a digital value using the A/D converter 26, and checks whether the value is larger than a predetermined value. If the CPU 20 determines that the data value is larger than the predetermined value (A in FIG. 2H), the vibration wave motor is not in a fixation state and can be normally driven. Therefore, in step 4, the vibration wave motor is normally driven. Normal driving is performed in a frequency range lower than fl.

If NO in step 3, the CPU 20 checks in step 5 whether the frequency decreases to a frequency fn in the normal driving mode. If NO in step 5, the flow returns to step 2.

The frequency is swept from fl to fn until the CPU 20 determines no fixation in step 3. When the CPU 20 determines that data from the A/D converter does not reach the predetermined value even after the frequency for determining the fixation is swept to fn, the flow advances to step 6 for peeling off the fixation.

In step 6, fA is set as an initial frequency for peeling off the fixation. The frequency fA is higher than both the resonant frequency in fixation mode and the frequency fl. In step 7, the same processing as in step 3 is performed to check whether the fixation is peeled off. If YES in step 7, the flow shifts to step 8 to set flag T to 1. In step 9, the frequency is decreased by Δf. In step 10, the CPU 20 checks whether the frequency becomes a minimum frequency fB for peeling off the fixation. If NO in step 10, the flow returns to step 7. The minimum frequency is set lower than the resonant frequency in the normal driving mode. The frequency fn may be equal to or different from the frequency fB. This operation is repeated until the frequency becomes fB, and the frequency is swept from fA to fB to peel off the fixation. In step 11, the CPU 20 checks whether flag T=1. If YES in step 11, the CPU 20 determines that the fixation peels off, and the flow shifts to step 4 to normally drive the vibration wave motor. If NO in step 11, the flow returns to step 6 to resume sweeping for peeling off the fixation.

In the first embodiment, the presence/absence of the fixation is determined by a voltage value from the detecting piezoelectric element. Instead, the frequency at which the voltage of the piezoelectric element exhibits a maximum value upon sweeping the frequency may be detected to check whether this frequency falls within the resonant frequency range in fixation mode. The current value to the piezoelectric element upon sweeping the frequency may be monitored to determine the presence/absence of fixation from the magnitude of the current value. An encoder for detecting rotation of the motor may be arranged, and a signal from the encoder that represents the start of rotation of the motor may be detected to determine the absence or peeling off of fixation when the start of rotation is detected. In this case, if the start of rotation is detected by detecting a signal from the encoder in steps 3 and 7 in FIG. 8, the flow may shift to steps 4 and 8.

Figure 9:
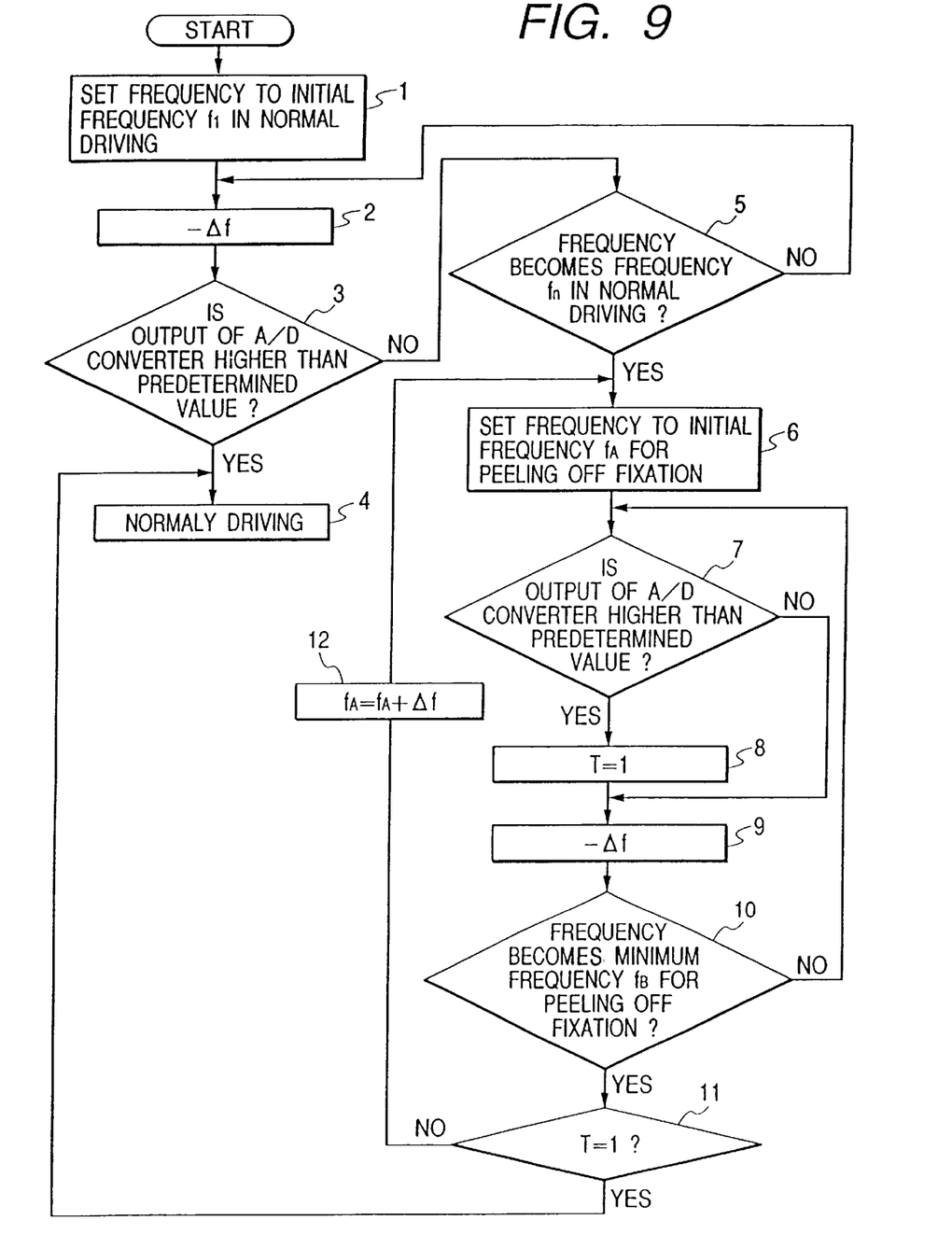
FIG. 9 is a flow chart showing another control flow.

FIG. 9 is a flow chart showing another example of frequency sweeping in peeling off the fixation. This flow chart is different from the flow chart in FIG. 8 by only step 12. In the flow of FIG. 9, every time the frequency is swept to peel off the fixation, the start frequency for peeling off the fixation is set higher by a predetermined value in step 12, and the frequency is swept again.

Figure 10:
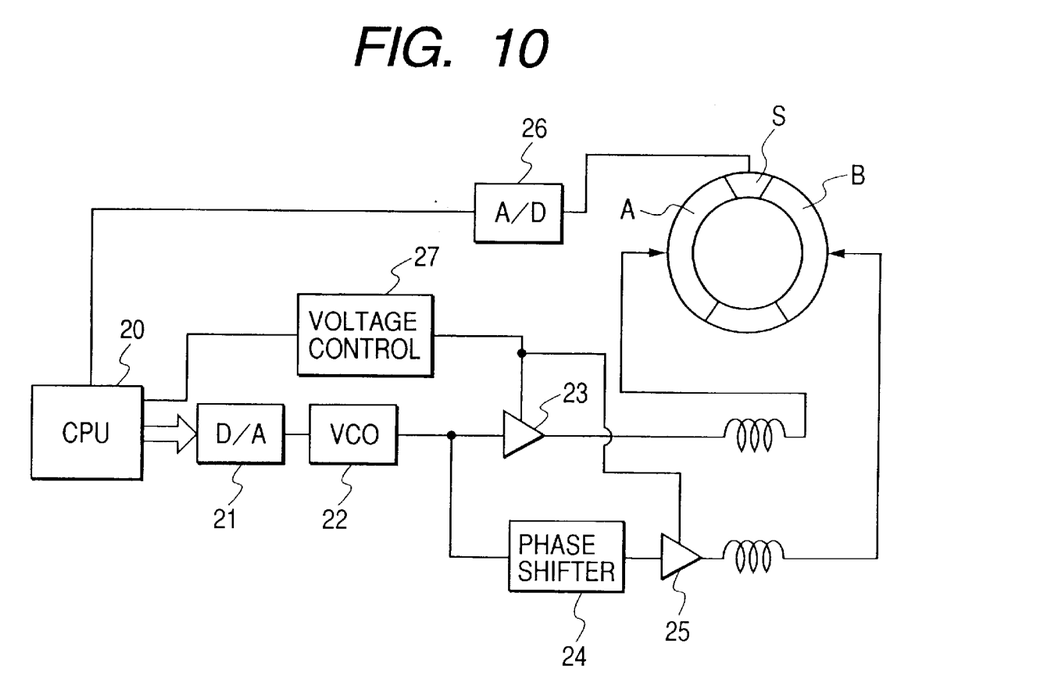
FIG. 10 is a block diagram showing another embodiment of the present invention.

FIG. 10 shows another circuit example of the driving apparatus for the vibration wave motor in which a voltage-control circuit 27 is added to the arrangement in FIG. 7 to control the voltage of the amplifiers using the circuit 27, and thereby to control a voltage applied to the piezoelectric elements.

Figure 11:
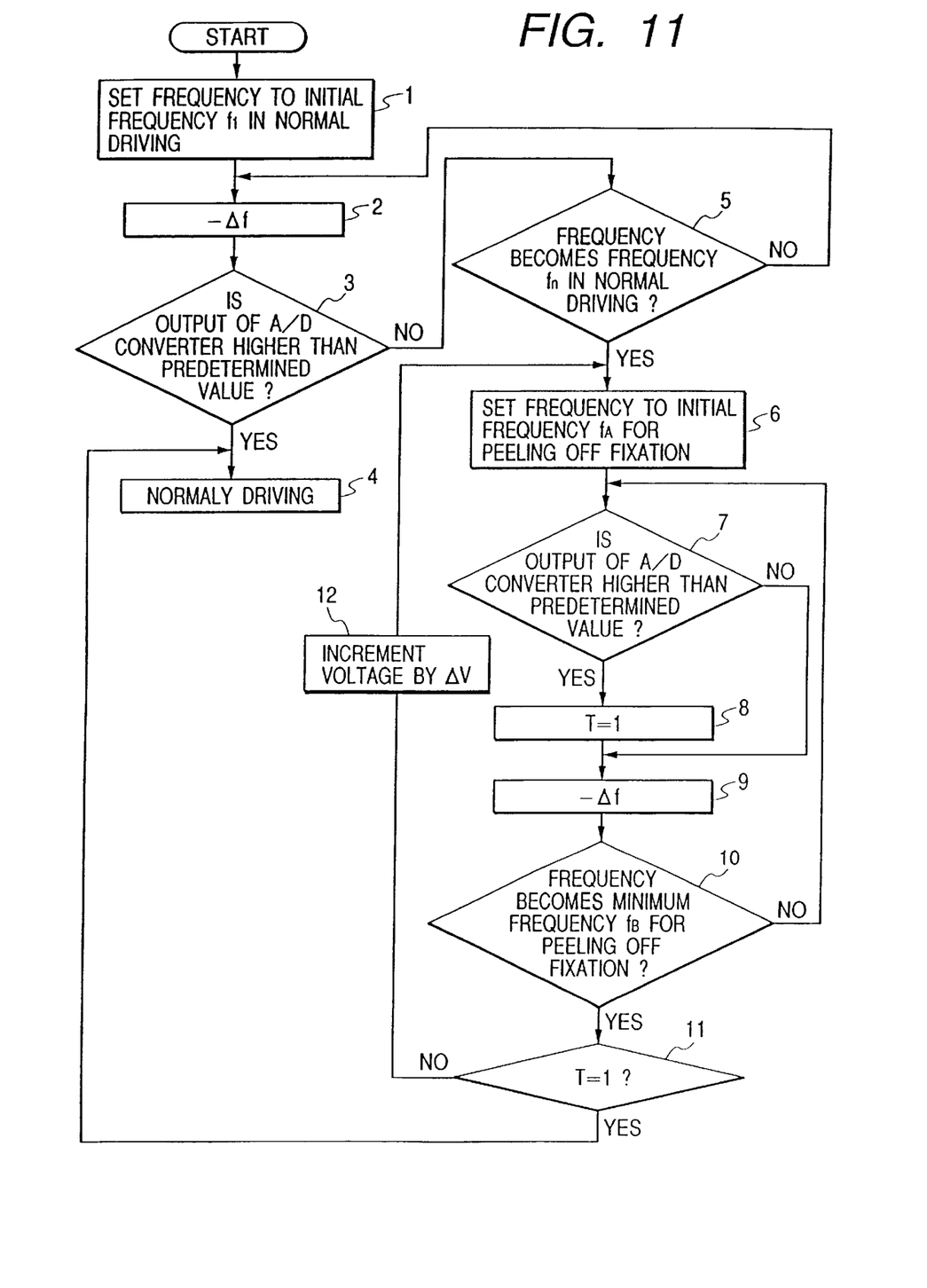
FIG. 11 is a flow chart showing a control flow used by the computer in FIG. 10.

FIG. 11 shows a control flow in the arrangement of FIG. 10. This flow is different from the flow in FIG. 8 by only step 12. In this flow of FIG. 11, every time the frequency is swept again to peel off the fixation, a driving voltage applied from the voltage-control circuit to the amplifiers 23 and 25 is incremented by a predetermined value in accordance with a command from the CPU 20. The frequency is swept while the applied voltage to the piezoelectric element is incremented for every sweeping operation.

Figure 12:
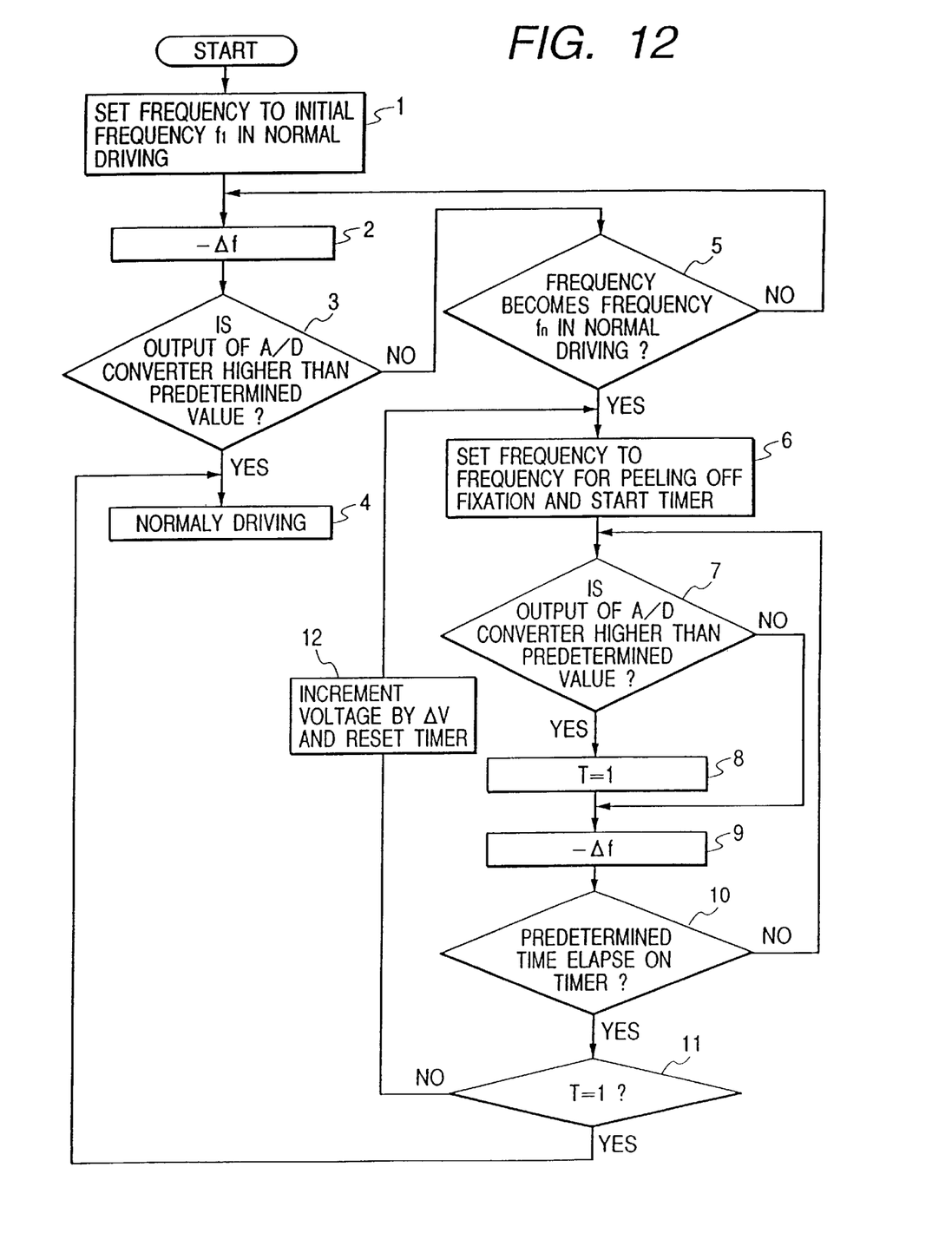
FIG. 12 is a flow chart showing still another control flow.

In FIG. 11, the frequency is swept in peeling off the fixation. Alternatively, as shown in FIG. 12, in peeling off the fixation, the frequency may be locked to a predetermined frequency (e.g., around the resonant frequency in fixation mode or a higher frequency) higher than the frequency in the normal driving mode, a frequency signal may be applied to the piezoelectric element for a predetermined time, and when the CPU 20 determines that the fixation is not peeled off, the voltage may be incremented by a predetermined amount to apply a frequency signal for a predetermined time, similar to the flow in FIG. 11.

In the above embodiments, frequency signals having different phases are applied to the groups of piezoelectric elements (A phase and B phase). To reduce the voltage Vp for peeling off the fixation, the fixation may be peeled off by making the time phases of the groups of piezoelectric elements equal. In this arrangement, the frequency was swept from 75 to 62 kHz for 2 sec, and the voltage Vp was measured to confirm that the fixation peeled off at a voltage 85% the normal voltage used when the phase is shifted by 90°. This is because a standing wave is generated on the ring by applying voltages having the same phase, and the maximum amplitude theoretically increases by about 40%, compared to the case of generating a travelling wave by the same applied voltage.

A decrease in voltage Vp is smaller than an increase in amplitude because the standing wave increases the maximum amplitude, but the presence of a portion which has a small amplitude or hardly vibrates makes it difficult to peel off the fixation. Even at a small-amplitude portion, the fixation is peeled off by deformation of a large-amplitude portion.

When the fixation is peeled off by the standing wave, the voltage can be reduced, as described above. Upon peeling off, however, the stator only strikes the rotor and cannot rotate it, and an external sensor (e.g., encoder) cannot confirm and control peeling off.

For this reason, in some cases, a time phase difference of about 5 to 10° is preferably set between the groups of piezoelectric elements (A phase and B phase) so as to rotate the rotor upon peeling off of the fixation.

Figure 13:
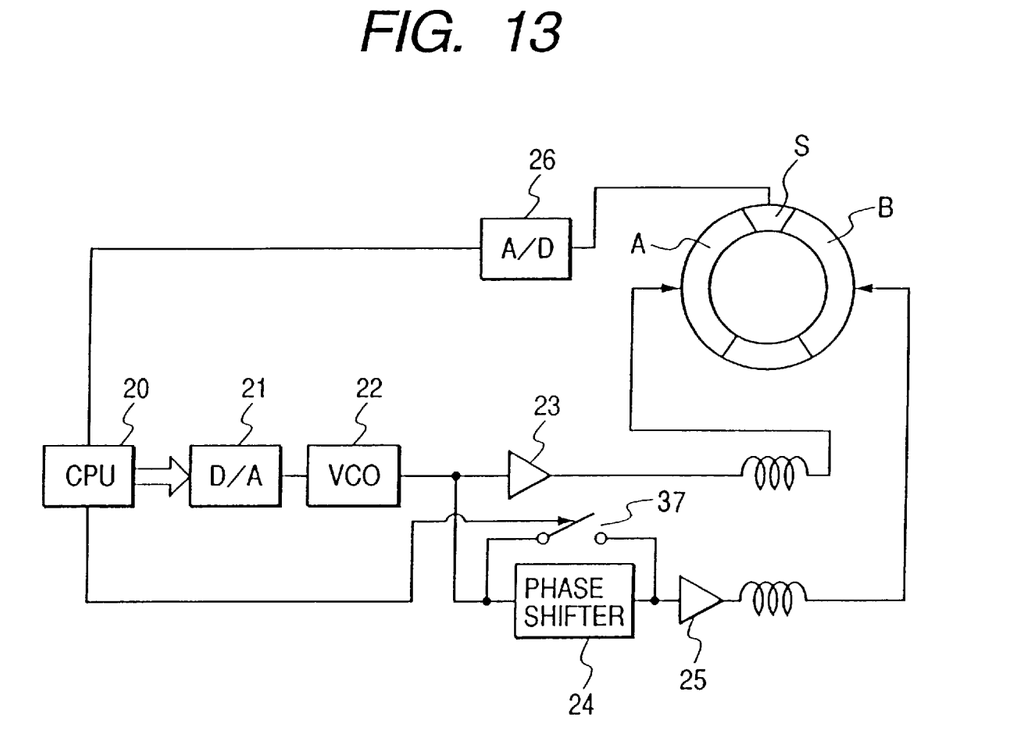
FIG. 13 is a block diagram showing still another embodiment of the present invention.

An arrangement for sweeping the frequency to peel off the fixation without any phase difference between the groups of piezoelectric elements can be realized by a driving circuit in FIG. 13. The driving circuit in FIG. 13 is different from the circuit in FIG. 7 by only a switching circuit 37 which is turned on/off by a command signal from the CPU 20. As a control flow for the circuit in FIG. 13, the circuit 37 in FIG. 13 is turned on to apply driving signals having the same phase to the piezoelectric elements and to activate the motor by generating a standing wave in steps 1, 2, 3, 5, 6, 7, 8, 9, 10 and 11, in the flow of FIG. 8, and the circuit 37 is turned off to drive the motor with a phase difference of 90° in the normal driving mode of step 4.

As another means for checking the fixation, other than the means described in the above embodiments, several phenomena such as an increase in resonant frequency and mechanical changes in Q can be adopted.

The frequency of detection of the fixation can be properly selected depending on the use state (including the environment) of a product incorporating the vibration wave apparatus such that the fixation may be detected only upon turning on the power supply, periodically by a timer, or for every driving operation.

What is claimed is:

1. A control apparatus for a vibration wave motor, in which a plurality of frequency signals respectively are applied to predetermined electro-mechanical energy conversion element parts arranged on a vibration member of the vibration wave motor, thereby to generate vibration in the vibration member, and whereby vibration generated in the vibration member provides a driving force that causes a contact member in contact with the vibration member to move relative to the vibration member, said control apparatus comprising:

a driving circuit operable in a normal operation mode, in which said driving circuit sets a frequency of an applied frequency signal to a first frequency as a start frequency, and sweeps the frequency of the applied frequency signal from the first frequency to a lower frequency so as to start a driving operation of the vibration wave motor, and operable in a non-normal operation mode, in which said driving circuit sets, as the start frequency, a second frequency higher than the first frequency, and sweeps the frequency of the applied frequency signal from the second frequency to a lower frequency; and a mode changing circuit which changes the operation mode of said driving circuit from the normal operation mode to the non-normal operation mode when the vibration wave motor does not achieve a normal driving state in the normal operation mode.

2. A control apparatus according to claim 1, wherein, if operation of the vibration wave motor in the non-normal mode fails to achieve a normal driving state the driving circuit repeats a driving operation in the non-normal operation mode.

3. A control apparatus according to claim 2, wherein, when the driving circuit repeats a driving operation in the non-normal operation mode, said driving circuit sets the start frequency at a frequency higher than the start frequency set in the previous non-normal operation mode.

4. A control apparatus according to claim 2, wherein, when the driving circuit repeats a driving operation in the non-normal operation mode, said driving circuit sets a voltage level of the frequency signal at a level higher than that used in the previous non-normal operation mode.

5. A control apparatus according to claim 1, wherein said mode changing circuit also changes the operation mode from the normal operation mode to the non-normal operation mode when an amplitude of a vibration of the vibration member becomes less than a predetermined amplitude or when a respective speed between the contact member and the vibration member becomes less than a predetermined speed.

6. A control apparatus according to claim 1, wherein, in the non-normal operation mode, the plurality of frequency signals have the same phase.

7. A control apparatus for a vibration wave motor, in which a plurality of frequency signals respectively are applied to predetermined electro-mechanical energy conversion element parts arranged on a vibration member of the vibration wave motor, thereby to generate vibration in the vibration member, and whereby vibration generated in the vibration member provides a driving force that causes a contact member in contact with the vibration member to move relative to the vibration member, said control apparatus comprising:

a driving circuit operable in a normal operation mode, in which said driving circuit sets a frequency of an applied frequency signal to a predetermined frequency as a start frequency, and sweeps the frequency of the applied frequency signal from the predetermined frequency to a lower frequency so as to start a driving operation of the vibration wave motor, and operable in a non-normal operation mode, in which said driving circuit locks the frequency of the applied frequency signal at the predetermined frequency, and gradually increases a level of the frequency signal; and a mode changing circuit which changes the operation mode from the normal operation mode to the non-normal operation mode when the vibration wave motor does not achieve a normal driving state in the normal operation mode.

8. A control apparatus according to claim 7, wherein, in the non-normal operation mode, the plurality of frequency signals have the same phase.

* * * * *

UNITED STATES PATENT AND TRADEMARK OFFICE
CERTIFICATE OF CORRECTION

PATENT NO. : 6,229,245 B1  
DATED : May 8, 2001  
INVENTOR(S) : Koji Kitani

It is certified that error appears in the above-identified patent and that said Letters Patent is hereby corrected as shown below:

Column 3,  
Line 40, "(2)" should be deleted.

Column 4,  
Line 3, "he" should read -- the --.

Column 5,  
Line 6, "flow," should read -- flow; --.

Signed and Sealed this

Nineteenth Day of February, 2002

Attest:

JAMES E. ROGAN  
*Attesting Officer*     *Director of the United States Patent and Trademark Office*